United States Patent
Ahmadvand et al.

(10) Patent No.: US 11,663,280 B2
(45) Date of Patent: May 30, 2023

(54) SEARCH ENGINE USING JOINT LEARNING FOR MULTI-LABEL CLASSIFICATION

(71) Applicant: Home Depot Product Authority, LLC, Atlanta, GA (US)

(72) Inventors: Ali Ahmadvand, Atlanta, GA (US); Surya Kallumadi, Atlanta, GA (US); Faizan Javed, Atlanta, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 79 days.

(21) Appl. No.: 17/070,518

(22) Filed: Oct. 14, 2020

(65) Prior Publication Data

US 2021/0110208 A1 Apr. 15, 2021

Related U.S. Application Data

(60) Provisional application No. 62/915,272, filed on Oct. 15, 2019.

(51) Int. Cl.
*G06K 9/62* (2022.01)
*G06F 16/9535* (2019.01)
*G06N 3/04* (2006.01)

(52) U.S. Cl.
CPC ....... *G06K 9/6257* (2013.01); *G06F 16/9535* (2019.01); *G06K 9/628* (2013.01); *G06N 3/0454* (2013.01)

(58) Field of Classification Search
CPC .... G06F 16/9535; G06F 16/248; G06F 16/35; G06K 9/6257; G06K 9/628; G06N 3/0454; G06N 3/0481; G06N 20/00; G06N 3/08

USPC ........................................................ 707/708
See application file for complete search history.

(56) References Cited

U.S. PATENT DOCUMENTS

| | | | |
|---|---|---|---|
| 8,478,780 B2 * | 7/2013 | Cooper ............... | G06F 16/3344 707/771 |
| 9,361,642 B1 | 6/2016 | Burton et al. | |
| 2008/0118151 A1 * | 5/2008 | Bouguet ............. | G06K 9/6253 382/181 |
| 2008/0189330 A1 * | 8/2008 | Hoos ...................... | G06F 16/68 |
| 2010/0185659 A1 | 7/2010 | Bai et al. | |
| 2011/0289025 A1 * | 11/2011 | Yan ....................... | G06N 5/025 706/47 |
| 2012/0323948 A1 * | 12/2012 | Li ...................... | G06F 16/3323 707/765 |

(Continued)

OTHER PUBLICATIONS

ISA/US, International Search Report and Written Opinion issued in PCT/US2020/055736, dated Jan. 26, 2021, 14 pgs.

*Primary Examiner* — Ashish Thomas
*Assistant Examiner* — Abdullah A Daud
(74) *Attorney, Agent, or Firm* — Greenberg Traurig. LLP

(57) ABSTRACT

A method of configuring a search engine to classify a search query includes receiving a search query data set, the search query data set comprising a plurality of search queries, defining a first set of candidate labels and a second set of candidate labels according to the search queries in the search query data set, concatenating the first set of candidate labels with the second set of candidate labels to generate a concatenated candidate label set, generating a compatibility matrix comprising a similarity between the concatenated candidate label set and the search query data set, and training a classification network according to the compatibility matrix.

15 Claims, 4 Drawing Sheets

(56) References Cited

U.S. PATENT DOCUMENTS

| | | | |
|---|---|---|---|
| 2014/0101126 A1* | 4/2014 | Kasterstein | G06F 16/9535 |
| | | | 707/707 |
| 2014/0222503 A1* | 8/2014 | Vijayaraghavan | ............................. |
| | | | G06Q 30/0201 |
| | | | 705/7.29 |
| 2015/0081279 A1* | 3/2015 | Suleman | G06F 40/237 |
| | | | 704/9 |
| 2015/0293976 A1* | 10/2015 | Guo | G06N 3/0454 |
| | | | 707/706 |
| 2017/0011310 A1* | 1/2017 | Hu | G06N 20/00 |
| 2017/0351951 A1* | 12/2017 | Santos | G06N 3/08 |
| 2018/0349477 A1* | 12/2018 | Jaech | G06F 16/3334 |
| 2019/0205470 A1* | 7/2019 | Ronen | G06F 16/285 |
| 2019/0286731 A1* | 9/2019 | Chiba | G06F 16/24522 |
| 2019/0294692 A1 | 9/2019 | Zhao et al. | |
| 2019/0332492 A1* | 10/2019 | Marelas | G06F 16/137 |
| 2020/0410053 A1* | 12/2020 | Zhang | G06N 3/0454 |
| 2021/0035017 A1* | 2/2021 | Catterson | G16H 10/00 |
| 2021/0366016 A1* | 11/2021 | Hiranandani | G06N 20/00 |

* cited by examiner

SEARCH ENGINE USING JOINT LEARNING FOR MULTI-LABEL CLASSIFICATION

CROSS-REFERENCE TO RELATED APPLICATION

This application claims the benefit of priority to U.S. provisional application No. 62/915,272, filed Oct. 15, 2019, the entirety of which is hereby incorporated by reference.

TECHNICAL FIELD

This disclosure relates to improving predictive results of search engine queries using multi-label classification and generating training data based on joint learning.

BACKGROUND

Items, such as products or services, may be searched for by users of an electronic interface, such as an e-commerce website. A search engine generates results that match or are otherwise responsive to the search query

BRIEF DESCRIPTION OF THE DRAWINGS

Many aspects of the present disclosure can be better understood with reference to the attached drawings. The components in the drawings are not necessarily drawn to scale, with emphasis instead being placed upon clearly illustrating the principles of the disclosure. Moreover, in the drawings, like reference numerals designate corresponding parts throughout several views.

DETAILED DESCRIPTION

Search engines allow a user to submit a search query and generate a list of outputs that are deemed most relevant to the search query. In the context of e-commerce websites, search engines control what products, services, documents, or information a user sees based on how the user has searched the e-commerce website.

The present disclosure improves a search engine by using training data, query labeling, joint learning, multitask learning, and classifiers to provide search results that enable a user to better navigate an e-commerce website or other electronic interface with a search engine. One aspect of the present disclosure includes a process for configuring and implementing a search engine that provides search results reflecting (1) the user's intent in making the query (e.g., to find information, to find a product to purchase); and/or (2) the desired product category or categories. To configure the search engine, the process may include applying multiple potential labels (e.g., matrices of such labels) for a search query to indicate both the intent of the search and the desired product category or categories. The multiple potential labels may be concatenated (e.g., by concatenating two or more matrices), processed, and input into a bifurcated classification layer to train a plurality of classifiers. After configuration, the search engine may classify an intent of the user search query and one or more product categories targeted by the search query. The present disclosure also includes methods and systems for generating training data to train the classifiers.

Figure 1:
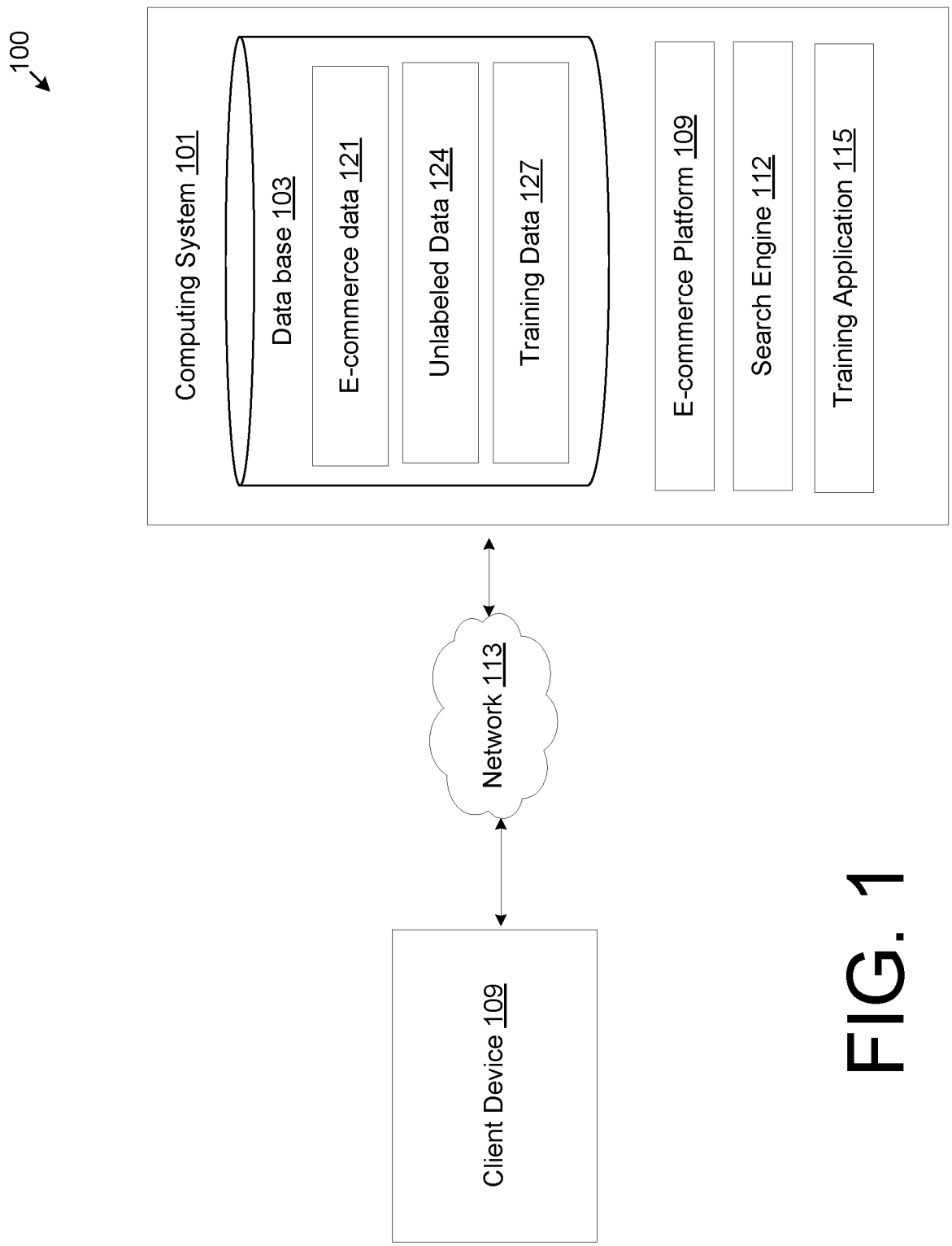
FIG. 1 is a diagrammatic view of a networked environment for providing a search engine using multi-label classification according to an embodiment.

Referring now to the drawings, wherein like numerals refer to the same or similar features in the various views, computing capability, FIG. 1 shows a computing environment 100 according to various embodiments. The computing environment includes a computing system 101 that is made up of a combination of hardware and software. The computing system 101, or one or more components or portions thereof, may execute one or more of the processes, methods, algorithms, etc. of this disclosure, such as the methods of FIGS. 2 and 3, for example.

The computing system 101 includes a database 103, an e-commerce platform 109, a search engine 112, and a training application 105. The computing system 101 may be connected to a network 118 such as the Internet, intranets, extranets, wide area networks (WANs), local area networks (LANs), wired networks, wireless networks, or other suitable networks, etc., or any combination of two or more such networks.

The computing system 101 may comprise, for example, a server computer or any other system providing computing capability. Alternatively, the computing system 101 may employ a plurality of computing devices that may be arranged, for example, in one or more server banks or computer banks or other arrangements. Such computing devices may be located in a single installation or may be distributed among many different geographical locations. For example, the computing system 101 may include a plurality of computing devices that together may comprise a hosted computing resource, a grid computing resource and/or any other distributed computing arrangement. In some cases, the computing system 101 may correspond to an elastic computing resource where the allotted capacity of processing, network, storage, or other computing-related resources may vary over time. The computing system 101 may implement one or more virtual machines that use the resources of the computing system 101.

Various applications and/or other functionality may be executed in the computing system 101 according to various embodiments. Also, various data is stored in the database 103 or other memory that is accessible to the computing system 101. The database 103 may represent one or more databases 103.

The e-commerce platform 109, search engine 112, and training application 105 mentioned above may be components executed on the computing system 101. These components may generate data and store the data on the database 103 and/or access the contents of the database 103. The e-commerce platform 109 may be implemented as one or more web servers that enable users to view online products, access product information, submit requests, and purchase products for sale. The e-commerce platform 109 may comprise a portal to provide access to product information, such as an e-commerce website respective of a retailer.

The instant disclosure discusses specific embodiments in which a search engine is deployed on an e-commerce platform, and therefore that the relevant categories and user intents relate to products. It should be understood, however, that the techniques, processes, etc. of this disclosure may be applicable to search engines in other contexts, and therefore the categories and user intents relevant to the techniques, processes, etc. may be unrelated to products, in some embodiments.

The search engine 112 may be a module that receives search queries and generates search results. The search engine 112 works in conjunction with the e-commerce platform 109 to serve one or more links to webpages to allow the user to navigate a website managed by the e-commerce platform 109. The search engine 112 may comprise a classification layer that implements a neural network to generate search results. The training application 115 may be used to generate training data. For example, the training application 115 may ingest unlabeled data, apply labels, and generated labeled data for training one or more classifiers in a search engine 112.

The data stored in the database 103 may include e-commerce data 121, unlabeled data 124, and training data 127. E-commerce data 121 may include information about products offered for sale via the e-commerce platform 109 such as, for example, product names, numbers, images, descriptions, categories, etc. E-commerce data 121 may be used to generate webpages to allow a user to browse, view, interact, and purchase products. E-commerce data 121 may also include a taxonomy of product categories. For example, the taxonomy may include several categories of products and their respective sub-categories. Unlabeled data 124 may include a history of search queries and their respective associated navigation history. For example, a search for "discount electric drill" may be a user's search query included in unlabeled data 124, and its corresponding navigation history may include the various webpages that the user visited and other actions taken by the user (e.g., purchasing items) in response to being presented with the results to the search query, which navigation history may also be included in unlabeled data 124. The reference to data being "unlabeled" indicates that the data has not been processed or otherwise tagged with labels for purposes of training a classifier.

Training data 127 includes data that has been labeled for purposes of training a classifier. The training data 127 may include, for example, paired user queries and a defined user intent associated with each query, and/or paired user queries and one or more product categories in which the user intended to obtain search results.

As an example of unlabeled data 124 and training data 127, a search query dataset D may be defined as D={Q, C, U}, where Q is a set of user search queries Q={$q_1, q_2, \ldots, q_{|Q|}$}, C is a set of candidate product categories C={$c_1, c_2, \ldots, c_{|C|}$}, and U is a set of candidate user product intents U={$u_1, u_2, \ldots, u_{|U|}$}. In some embodiments, the search query dataset D may be the unlabeled data 124. A subset of labels C(qi)={$c_{i1}, \ldots, C_{i|C|}$} ⊂ C as well as one of the intent labels U(qi)={$u_{i1}, \ldots, u_{i|U|}$} may be assigned to each search query qi ∈Q, and such assignments may, along with the search queries Q, be the training data 127, in some embodiments.

The computing environment 100 also includes one or more client device(s) 109. A client device 109 allows a user to interact with the components of the computing system 101 over a network 118. A client device 109 may be, for example, a cell phone, laptop, personal computer, mobile device, or any other computing device used by a user. The client device 109 may include an application such as a web browser or mobile application that communicates with the e-commerce platform 109 to access information, submit requests or information, and to purchase products for sale.

Figure 2:
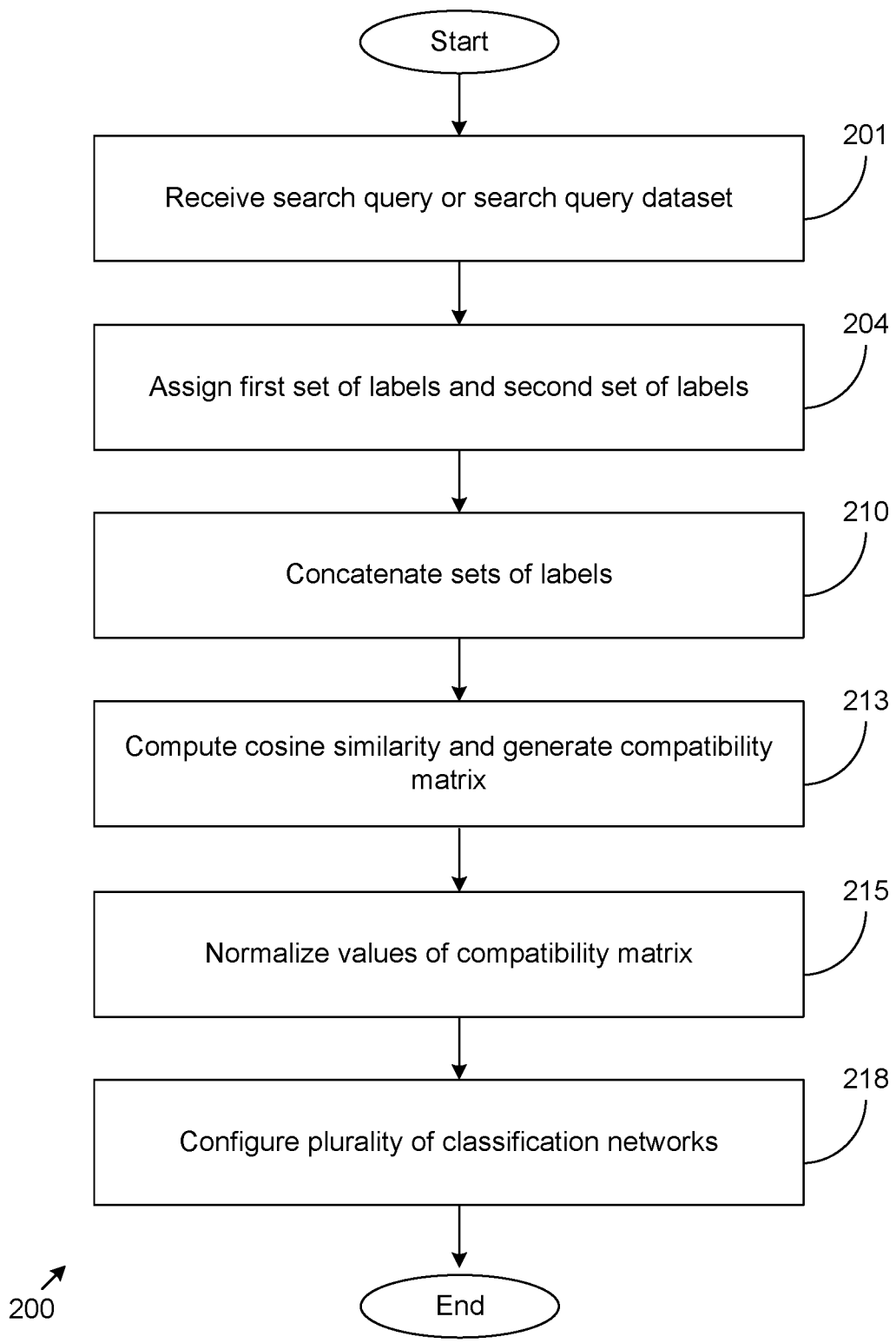
FIG. 2 is a flow chart illustrating an example method of configuring a search engine to provide multiple classification labels of a search query in the networked environment of FIG. 1.

Next, a general description of the operation of the various components of the computing system 101 is provided. The computing system 101 may receive a search query from a user client device 109 via a network 113. The search engine 112 receives the search query and generates search results. This process of executing a search engine 112 for users using an e-commerce platform is referred to herein as "run-time". The present disclosure is directed to classifying search queries to generate multiple labels for improved search results. FIG. 2, which is discussed in detail below, provides an embodiment of a method for configuring a search engine 112 in accordance with the present disclosure. To briefly summarize, the search engine 112 may be configured to assign multiple labels to an input search query. A label vector made up of multiple labels for a given search query may be processed and then used to configure separate classification networks. In this respect, the search engine 112 is configured to classify a user intent, one or more product categories, and/or other information desired by the user in the search query.

Figure 3:
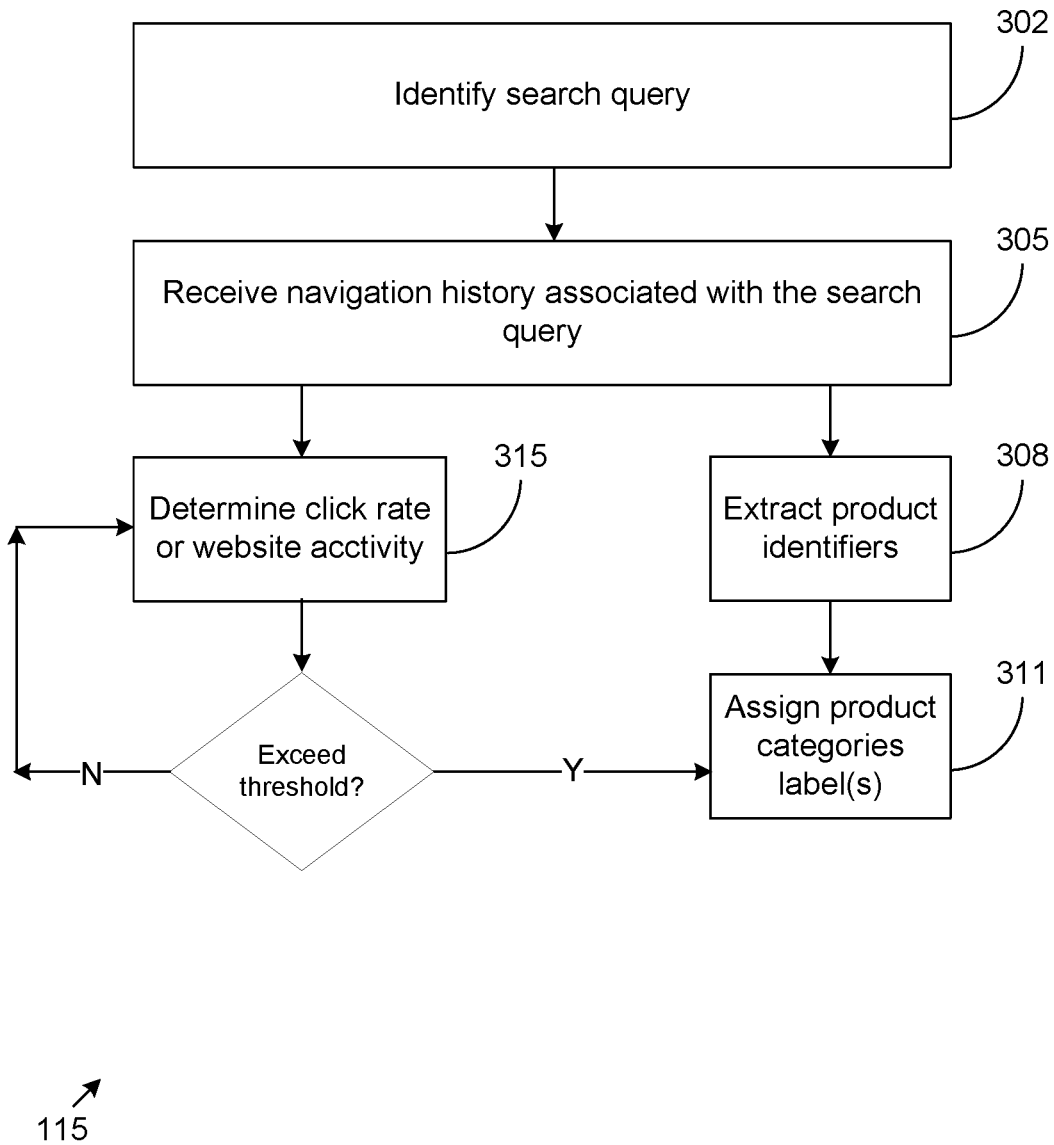
FIG. 3 is a flow chart illustrating an example method of generating training data.

In addition, the classification networks may be trained using training data 127. To generate the training data 127, unlabeled data 124 may be processed using information on how a user has interacted with the e-commerce platform 109 to generate multi-labeled data. FIG. 3, which is discussed in further detail below, describes embodiments for generating training data 127.

FIG. 2 is a flowchart illustrating an example method 200 that may be applied by the search engine 112 and/or other aspect of computing system 101, according to various embodiments of the present disclosure. The method 200 provides an embodiment of configuring a search engine 112 to provide multiple classification labels of a search query. It is understood that the flowchart of FIG. 2 provides merely an example of the many different types of functional arrangements that may be employed to implement the operation of the portion of the computing system 101 as described herein.

At block 201, the computing system 101 receives a search query dataset. The search query dataset may include a plurality of search queries, each search query including a respective string of characters and a series of one or more words. The search query dataset may include, for each search query, a set of associated labels, including respective associated category and user intent labels. The labels may be associated with the search queries in the search query dataset according to the method of FIG. 3, in some embodiments.

In some embodiments, receiving the search query dataset may include converting the search query dataset into one or more embedding vectors representative of the search queries in the search query dataset. For example, each search query may be converted into a respective embedding vector. In another embodiment, receiving the search query dataset may include receiving one or more embedding vectors representative of the search queries. For example, a plurality of embedding vectors may be received, each representing a respective search query in the search query dataset. In some embodiments, the search query dataset can include thousands, tens of thousands, hundreds of thousands, millions, or more queries.

At block 204, the computing system 101 may define a first set of candidate labels and a second set of candidate labels. The first set of candidate labels may be labels for a product category. For example, for a search query "LED lighting fixture" the product category labels may include "Kitchen Lighting" and "Bathroom Lighting". In this respect, a search query may map to several product categories each having a respective label. The second set of candidate labels may include labels for a searcher's intent. Intent labels may include, for example, How To, Delivery, Discount, Gift Card, Hours, Installation, Promo, Rental, Service, Status, and Warranty. Thus, the intent labels refer to why the searcher is submitting a search query, which is different than the product category the searcher is searching. As explained above, the first set of labels does not overlap with the second set of labels.

As noted above, first set of candidate labels may be a first embedding vector and the second set of candidate labels may be a second embedding vector. In addition, word embedding layers may be determined from the search queries, thereby utilizing three different embedding vectors for a given search query. For example, in some embodiments, each search query can be modelled as a word sequence q of size $|N|$, $q=[q_1; q_2; q_3 \ldots q_n]$.

Each search query may be mapped to an embedding space $W^{|W| \times V_w}$. In some embodiments $V_w = V_l$, which may have a value on the order of hundreds. In some embodiments, the word vectors may be initialized with popular word embeddings associated with the search engine on which the trained model will be applied. In other embodiments, the word vectors may be initialized with random embeddings. V may therefore represent both word and label embeddings.

At block 210, the computing system 101 concatenates the first set of candidate labels and second set of candidate labels to generate a concatenated set of labels. Concatenating the sets of candidate labels may include concatenating a matrix of the first candidate labels with a matrix of the second candidate labels, in an embodiment, to generate a vector representative of the entire candidate label space.

In an example of block 210, a two-step analysis is applied to the candidate label sets. In one step, a candidate product category set C and a candidate user product intent set U may be mapped into matrices C and U, respectively. In another step, matrices C and U may be concatenated to generate a concatenated candidate label matrix L, as shown in equation (1) below:

$$L^{(|C|+|U|) \times V_1} = C^{|C| \times V_1} + U^{|U| \times V_1} \quad \text{(Eq. 1)}$$

At block 213, the computing system 101 computes a cosine similarity between the concatenated set of candidate labels and one or more embedding vectors representative of the search query dataset to generate a compatibility matrix, such as the word embedding vector. The compatibility matrix may include relationships between word representations in the search query dataset with their associated labels in the candidate label space. The compatibility matrix may represent the relative spatial information among consecutive words with their associated labels. For example, the compatibility matrix captures the co-occurrence of words such that it indicates instances where a particular order or proximity of words appear at a relatively high frequency.

At block 215, computing system 101 normalizes the values of the compatibility matrix. For example, the computing system 101 may apply a softmax function to the compatibility matrix, and/or other functions. Other functions include, for example, a rectified linear unit (ReLU) function and a max pooling function. The normalized compatibility matrix may reflect the attentions scores that modify the word representations of the search query according to their associate label representations.

In an example of blocks 213, 215, an example compatibility matrix H may result from calculating a cosine similarity of L with word vector matrix W of query q. To compute the cosine similarity, each word vector and label vector may be normalized, and the normalized vectors may be multiplied according to equation (2), below:

$$H = L^{(|C|+|U|) \times V} \times W^{|N| \times V})^T \quad \text{(Eq. 2)}$$

H is a matrix of size $(|C|+|U|) \times |N|$, and may be applied as attention scores to modify the word representations in a query according to their associate label representations. To this end, a ReLU function, followed by a max-pooling layer and softmax function may be deployed to represent the final feature vector, according to equations (3), (4), and (5) below.

$$\alpha = ReLU(H \times W + b) \quad \text{(Eq. 3)}$$

$$m = \text{Max-pooling}(\alpha) \quad \text{(Eq. 4)}$$

$$G = \frac{e^{m_i}}{\sum_{i=1}^{|V|} e^{m_i}} \quad \text{(Eq. 5)}$$

where G is a matrix of size $(|C|+|U|) \times |N|$ and W and b are the weights and bias that are learned during training. G may be split into two matrices of size $\hat{G} = (|C| \times |N|)$ and $\hat{G} = (|U| \times |N|)$. For the product category mapping, the word embedding vectors W may be fed into a ReLU layer to add more non-linearity to the model, then the output is multiplied by their corresponding attention scores of $\hat{G}$, as shown in equations (6) and (7) below:

$$\alpha_c = ReLU(H \times W_c + b_c) \quad \text{(Eq. 6)}$$

$$CW^{|N| \times v} = \sum_{n=1}^{|N|} \hat{G}_n \times \alpha_{cn} \quad \text{(Eq. 7)}$$

Similarly, for user intent classification (e.g., product or information), the word embedding vectors may be input to a ReLU layer then multiplied by their corresponding attention scores, as shown in equations (8) and (9) below:

$$\alpha_u = ReLU(H \times W_u + b_u) \quad \text{(Eq. 8)}$$

$$UW^{|N| \times v} = \sum_{n=1}^{|N|} \hat{G}_n \times \alpha_{un} \quad \text{(Eq. 9)}$$

Then, CW and UW may be input to a fully connected layer to generate the semantic representations of both tasks. For multi-label classification (e.g., product category mapping), a sigmoid cross-entropy loss function may be used because, in sigmoid, the loss computed for every output is is not affected by other component values and, for user product intent mapping, a softmax function may be used, as shown in equations (10)-(12) below:

$$f(s)_{sigmoid} = \frac{1}{1 - e^{-si}} \quad \text{(Eq. 10)}$$

$$f(s)_{softmax} = \frac{e^{G_i}}{\sum_{1}^{v} e^{G_i}} \quad \text{(Eq. 11)}$$

$$CE(f(s)_i) = -\sum_{i=1}^{C} t_i \log(f(s)_i) \quad \text{(Eq. 12)}$$

To address the class imbalance problem particularly in the product category dataset, we update the loss values based on focal loss, as shown in equations (13) and (14) below:

$$\mathcal{L}_{category} = \sum_{i=1}^{C} \alpha_i (f(s_i)_{sigmoid} - t_i)^\gamma \log(f(s_i)_{sigmoid}) \quad \text{(Eq. 13)}$$

$$\mathcal{L}_{int} = \alpha(f(s)_{softmax} - t)^\gamma \log(f(s)_{softmax}) \quad \text{(Eq. 14)}$$

where t is the target vector, i is the class index, and $(f(s)-t)^\gamma$ is a factor to decrease the influence of well-classified samples in the loss.

An undirected graph can be formed to represent the co-occurrence of each label pair. As a result, a local pairwise proximity model between the vertices (labels) can be created in the form of a co-occurrence Matrix (CM). CM element in the index (i, j) represents the co-occurrence frequency between label-pair of ($l_i$, $l_j$) in the training set. Finally, CM has the size of (|C|+|U|)(|C|+|U|). Then, the final CM matrix is calculated by applying a matrix normalization on the CM. This probability can be empirically computed as equation (15), where the $CM_{(l_i, l_j)}$ shows the value corresponding to ($l_i$, $l_j$).

$$\mathcal{P}(V_{l_i}, V_{l_j}) = \frac{CM_{(l_i, l_j)}}{\sum_{(l_i, l_j) \in E} CM_{(l_i, l_j)}} \qquad \text{(Eq. 15)}$$

Moreover, P can be estimated using a joint probability which implemented by applying a sigmoid on the corresponding label embedding vectors of ($l_i$, $l_j$) in equation (16):

$$p(V_{l_i}, V_{l_j}) = \frac{1}{1 - e^{-(V_{l_i} \times V_{l_j})}} \triangleq \mathcal{P}(V_{l_i}, V_{l_j}) \qquad \text{(Eq. 16)}$$

The best vectors for a pair of label embedding $V_{l_i}$ and $V_{l_j}$ may be estimated by minimizing the KL-divergence distance between $p(V_{l_i}, V_{l_j})$ and $\mathcal{P}(V_{l_i}, V_{l_j})$, which can be computed as equation (17), below:

$$\mathcal{L}_{graph} = -\Sigma_{(l_i, l_j) \in E} CM_{(l_i, l_j)} \log(p(V_{l_i}, V_{l_j})) \qquad \text{(Eq. 17)}$$

$\mathcal{L}_{graph}$ may be used to modify the loss function by incorporating the label interaction information. In some embodiments, the final loss function may be computed by combining all three loss functions computed from user product intent, product category intent, and label graph. For example, it can be computed using a weighted average of the loss values illustrated in equations (13), (14), and (17).

$$\mathcal{L}_{total} = \beta_1 \mathcal{L}_{category} + \beta_2 \mathcal{L}_{int} + \beta_3 \mathcal{L}_{graph} \qquad \text{(Eq. 18)}$$

At block 218, the computing system 101 configures a plurality of classification networks. Each classification network may be configured using the normalized compatibility matrix and the word embedding vectors. According to an embodiment, the embedding word vector is processed using a ReLU function and then multiplied with the normalized compatibility matrix using a dot function. The result is used to configure the classification networks.

The classification networks may include an intent classifier and a product category classifier. Thus, once configured, the search engine 112 may use a bifurcated classification layer comprising separate classifiers to generate two different classifications for a search query.

In this respect, the classification layer of the search engine 112 may comprise separate neural networks to perform separate classifications. A first neural network may be a product category network while a second neural network may be an intent modelling network. The classification networks may be trained over a plurality of generations, using one or more of the search queries in the search query dataset and the associated product classification and user intent labels as positive and negative examples for the networks.

FIG. 2 describes configuring a search engine 112 that is able to simultaneously learn both user intent and product categories from a search query. FIG. 2 describes an example of using join learning and using multiple labels.

FIG. 3 depicts a process to generate training data 127. This process may be applied to unlabeled data 124 or may be generated dynamically as a user navigates an e-commerce platform 112.

At block 302, the training application 115 identifies a search query that is subject to labeling. As explained below, the search query begins without having any labels, and the process labels the search query for purposes of training a classifier. A search query submitted by a user forms the beginning stages of a search session. Throughout the search session, the user navigates the e-commerce platform 109 by interacting with or accessing various webpages served by the e-commerce platform in response to the search query. These interactions include clicking webpages associated with a product or product category, selecting information for review (e.g., hours of operation, installation information, warranty information, etc.), downloading materials, or actively viewing the webpages, selecting a product to be added to a shopping cart, purchasing items in a shopping cart, sharing the webpage with others, purchasing gift cards, viewing delivery status, etc. A user's activity is recorded as navigation history.

At block 305, the training application 115 receives the navigation history associated with the search query. The navigation history may be stored as part of the unlabeled data 124 or it may be generated in real-time as users submit search queries and navigate through the e-commerce platform 109. The navigation history is associated with a particular search session for a given search query.

At block 308, the training application 115 extracts product identifiers for products that have been added to an e-commerce shopping cart and then purchased. For example, as a user navigates the e-commerce website, the user selects one or more products for purchase. Product identifiers associated with these products are compiled into a list that is managed by a shopping cart of the e-commerce platform, in some embodiments.

At block 311, the training application 115 labels the search query with product categories associated with the product identifiers that are extracted from the navigation history at 308. An example of labeled product categories associated with queries is provided in table 1 below:

TABLE 1

| Search Queries | Product vs Informational | Product Category | Informational Category |
|---|---|---|---|
| where is my shipped order | Informational | — | Delivery |
| how to install my tiles | Informational | — | Instructional |
| cost to rent a carpet cleaner | Informational | — | Rental |
| 18 volt ryobi | Product | [tools, electrical, lighting] | — |
| 24 in. classic Samsung refrigerator | Product | [appliance, electrical] | — |

At block 315, the training application 115 determines a click rate for each product in a particular search session or the amount of time spent actively viewing a product during a particular search session. For example, the training application 115 determines how many clicks or other interactions take place on a particular product webpage or webpages of a product category. Alternatively or additionally, the training application 115 determines the amount of time spent viewing a product webpage or viewing webpages of a product/product category. The training application 115 quantifies the degree of interest for a product or product category in a search session by calculating the click rate and/or time spent actively viewing a webpage(s). If this exceeds a threshold amount, the training application 115 labels the search query with the product categories associated with the session.

As discussed above, FIG. 3 shows an embodiment of a training application 115 that generates product category labels for search queries for purposes of training a classifier. The training application 115 may also be configured to generate intent labels (e.g., labels indicating a user intent) for a target search query. For example, a user search query for "discount for 18 volt power drill" may be contrasted with the search query for "18 volt power drill." The former may refer to the user's intent for seeking information while the later could refer to the user's intent to purchase a product." Depending on how the user navigates through the webpages served by the e-commerce platform 109, the training application 115 may label the search query based on the user's intent.

One determination of user intent in an e-commerce website may be whether the user wants to purchase a product, or is only looking for some information on the website. Accordingly, in some embodiments, generating intent labels may include applying a hierarchical architecture in which, in a first layer, the intent of the user in purchasing a product versus seeking information is determined. Based on this determination, the search engine can provide a correct search page result or guide users to an appropriate web page to handle the user's request. For example, if the user inputs a search query of "18 volt ryobi", then, since the query has a product intent, the user has to be guided to a product page with relevant products.

In contrast, when the user inputs "18 volt ryobi rental", then the user may be guided to the relevant page that provides rental information. Example information-seeking query classes (e.g., which may be categories of user intent, and specifically categories of informational intent) may include Instructional, Delivery, Discount, Gift-Card, Store-Hours, Installation, Promo, Rental, Service, Status, and Warranty.

In some embodiments, blocks 308, 311, and/or 315 may be applied to determine user intents in the search queries. In such embodiments, a set of candidate queries may be selected from the search query data set using simple rules and labeled as informational queries. The simple rules may include, for example, string-matching algorithms between search queries and a set of unigrams, bigrams, and trigrams. In some embodiments, the set of unigrams, bigrams, and trigrams may be manually defined. In some embodiments, the simple labelling may be partially or entirely manual. In other embodiments, the simple labelling may be automated. Following the simple labelling, an iterative algorithm may be executed in which the dataset is gradually expanded using a K-Nearest Neighbor (KNN) model to create an expanded simply-labelled dataset. In some embodiments, K=3. To represent the search queries, a feature vector based on unigrams, bigrams, and trigrams is formed. Next, the difficult samples may be actively selected using a machine learning algorithm. For example, a support vector machine (SVM) classifier with an rbf kernel may be trained on the simply-labelled dataset, independent of the KNN expansion. The SVM model may be evaluated on the new samples added from the KNN expansion. The samples that are misclassified or located on the margin may be labeled as difficult samples and labelled manually, in some embodiments. The iterative algorithm may end when the size of the dataset is larger than the size of the product intent sample from the previous step.

Figure 4:
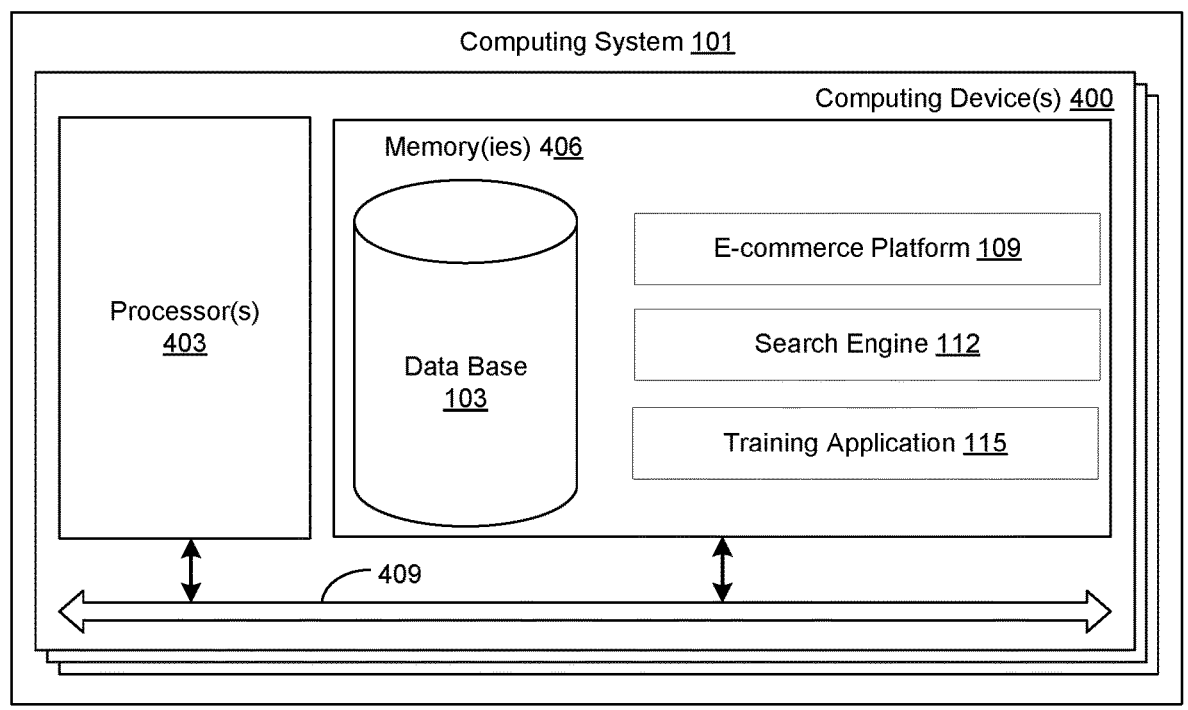
FIG. 4 is a schematic block diagram that provides one example illustration of a computing system 101 of FIG. 1 according to various embodiments of the present disclosure.

FIG. 4 is a schematic block diagram that provides one example illustration of a computing system 101 of FIG. 1 according to various embodiments of the present disclosure. The computing system 101 includes one or more computing devices 400. Each computing device 400 includes at least one processor circuit, for example, having a processor 403 and memory 406, both of which are coupled to a local interface 409 or bus. To this end, each computing device 400 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 is the e-commerce platform 109, search engine 112, and training application 115. Also stored in the memory 406 may be a database 103 and other data such as, for example e-commerce data 121, unlabeled data 124, and training data 127. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed, such as, for example, C, C++, C#, Objective C, Java®, JavaScript®, Perl, PHP, Visual Basic®, Python®, Ruby, or other programming languages.

Several software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and/or multiple processor cores and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the e-commerce platform 109, search engine 112, and training application 115 described herein may be embodied in software or code executed as discussed above, as an alternative the same may also be embodied in dedicated hardware or a combination of software/hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart discussed above show the functionality and operation of configuring a search engine according to a method 200. If embodied in software, each box may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system, such as a processor 403 in a computer system or other system. The machine code may be converted from the source code, etc. If embodied in hardware, each block may represent a circuit or a number of interconnected circuits to implement the specified logical function(s).

Although the flowchart shows a specific order of execution, it is understood that the order of execution may differ from that which is depicted. For example, the order of execution of two or more boxes may be scrambled relative to the order shown. Also, two or more boxes shown in succession may be executed concurrently or with partial concurrence. Further, in some embodiments, one or more of the boxes may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

The search engine 112 may also comprise software or code that can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the e-commerce platform 109, search engine 112, and training application 115 may be implemented and structured in a variety of ways. For example, one or more applications described may be implemented as modules or components of a single application. Further, one or more applications described herein may be executed in shared or separate computing devices or a combination thereof. For example, the software application described herein may execute in the same computing device 400, or in multiple computing devices in the same computing system 101. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A method of configuring a search engine to classify a search query, the method comprising:

receiving a search query data set, the search query data set comprising a plurality of search queries;

defining a first set of candidate labels and a second set of candidate labels according to the search queries in the search query data set by:
receiving user navigation histories associated with the search queries;
determining a plurality of items included in the user navigation histories;
determining a plurality of categories associated with the plurality of items, wherein the first set of candidate labels comprises the plurality of categories; and
identifying a plurality of user intents in the user navigation histories, wherein the second set of candidate labels comprises the plurality of user intents;
concatenating the first set of candidate labels with the second set of candidate labels to generate a concatenated candidate label set;
generating a compatibility matrix comprising a similarity between the concatenated candidate label set and the search query data set; and
training a classification network according to the compatibility matrix,
wherein training the classification network according to the compatibility matrix comprises training, according to the compatibility matrix, a first neural network for determining a category of a new search query and a second neural network for determining a user intent of the new search query.

2. The method of claim 1, further comprising:
converting each of the plurality of search queries into respective embeddings;
wherein generating the compatibility matrix comprises a similarity between the concatenated candidate category label set and the embeddings.

3. The method of claim 1, further comprising:
converting each of the plurality of search queries into respective embeddings;
wherein training the classification network is further according to the embeddings.

4. The method of claim 1, wherein the first set of candidate category labels comprises category labels in the search queries.

5. The method of claim 4, wherein the second set of candidate labels comprises user intent statements in the search queries.

6. The method of claim 1, wherein concatenating the first set of candidate labels with the second set of candidate labels to generate a concatenated candidate label set comprises concatenating a matrix of the first candidate labels with a matrix of the second candidate labels to generate a vector representative of the entire candidate label space.

7. A system for configuring a search engine to classify a search query, the system comprising:
a non-transitory, computer-readable memory storing instructions; and
a processor configured to execute the instructions to:
receive a search query data set, the search query data set comprising a plurality of search queries;
define a first set of candidate labels and a second set of candidate labels according to the search queries in the search query data set by:
receiving user navigation histories associated with the search queries;
determining a plurality of items included in the user navigation histories;
determining a plurality of categories associated with the plurality of items, wherein the first set of candidate labels comprises the plurality of categories; and
identifying a plurality of user intents in the user navigation histories, wherein the second set of candidate labels comprises the plurality of user intents;
concatenate the first set of candidate labels with the second set of candidate labels to generate a concatenated candidate label set;
generate a compatibility matrix comprising a similarity between the concatenated candidate label set and the search query data set; and
train a classification network according to the compatibility matrix,
wherein training the classification network according to the compatibility matrix comprises training, according to the compatibility matrix, a first neural network for determining a category of a new search query and a second neural network for determining a user intent of the new search query.

8. The system of claim 7, wherein the memory stores further instructions that, when executed by the processor, cause the processor to:
convert each of the plurality of search queries into respective embeddings;
wherein generating the compatibility matrix comprises a similarity between the concatenated candidate category label set and the embeddings.

9. The system of claim 7, wherein the memory stores further instructions that, when executed by the processor, cause the processor to:
convert each of the plurality of search queries into respective embeddings;
wherein training the classification network is further according to the embeddings.

10. The system of claim 7, wherein the first set of candidate category labels comprises category labels in the search queries.

11. The system of claim 10, wherein the second set of candidate labels comprises user intents in the search queries.

12. The system of claim 7, wherein concatenating the first set of candidate labels with the second set of candidate labels to generate a concatenated candidate label set comprises concatenating a matrix of the first candidate labels with a matrix of the second candidate labels to generate a vector representative of the entire candidate label space.

13. A method for responding to a user search request, the method comprising:
receiving a search query data set, the search query data set comprising a plurality of search queries;
defining a first set of candidate labels and a second set of candidate labels according to the search queries in the search query data set by:
receiving user navigation histories associated with the search queries in the search query data set;
determining a plurality of items included in the user navigation histories;
determining a plurality of categories associated with the plurality of items, wherein the first set of candidate labels comprises the plurality of categories; and
identifying a plurality of user intents in the user navigation histories, wherein the second set of candidate labels comprises the plurality of user intents;
concatenating the first set of candidate labels with the second set of candidate labels to generate a concatenated candidate label set;
generating a compatibility matrix comprising a similarity between the concatenated candidate label set and the search query data set;

training a classification network according to the compatibility matrix;

receiving, by a server, a new user search query;

applying, by the server, the trained classification network to the new user search query to identify at least one of a user intent or an item category; and providing, by the server, a response to the new user search query according to the at least one of a user intent or an item category, wherein training the classification network according to the compatibility matrix comprises training, according to the compatibility matrix, a first neural network for determining the category of a new search query and a second neural network for determining the user intent of the new search query.

14. The method of claim 13, wherein the new user search query is received from a user computing device.

15. The method of claim 14, wherein the response to the new user search query is provided to the user computing device.

* * * * *